US011534930B2

(12) United States Patent
Lu

(10) Patent No.: US 11,534,930 B2
(45) Date of Patent: Dec. 27, 2022

(54) BLADE MECHANISM AND ELECTRIC SCISSORS HAVING BLADE MECHANISM

(71) Applicant: YONGKANG WEIDE INDUSTRY AND TRADE CO., LTD., Yongkang (CN)

(72) Inventor: Huahua Lu, Yongkang (CN)

(73) Assignee: YONGKANG WEIDE INDUSTRY AND TRADE CO., LTD., Yongkang (CN)

( * ) Notice: Subject to any disclaimer, the term of this patent is extended or adjusted under 35 U.S.C. 154(b) by 174 days.

(21) Appl. No.: 16/898,410

(22) Filed: Jun. 10, 2020

(65) Prior Publication Data

US 2021/0299894 A1    Sep. 30, 2021

(30) Foreign Application Priority Data

Mar. 30, 2020   (CN) ......................... 202020437520.X

(51) Int. Cl.
*B26B 15/00* (2006.01)
*B26B 13/28* (2006.01)

(52) U.S. Cl.
CPC ............ *B26B 15/00* (2013.01); *B26B 13/285* (2013.01)

(58) Field of Classification Search
CPC ....... B26B 15/00; B26B 13/285; B26B 13/00; B26B 13/28
USPC .......... 30/228, 194, 224, 247, 249, 208–211, 30/215–218, 241
See application file for complete search history.

(56) References Cited

U.S. PATENT DOCUMENTS

| 1,778,346 | A | * | 10/1930 | Zeidler | ................... | B26B 13/04 30/349 |
| 3,672,053 | A | * | 6/1972 | Wiss | ....................... | B26B 13/28 30/267 |
| 4,592,141 | A | * | 6/1986 | Levine | .................... | B26B 13/06 30/138 |
| 5,987,754 | A | * | 11/1999 | Hirabayashi | ............ | B26B 15/00 30/228 |
| 6,966,115 | B2 | * | 11/2005 | Deville | .................... | A01G 3/02 30/250 |
| 2011/0061242 | A1 | * | 3/2011 | Chen | ....................... | B26B 15/00 30/228 |
| 2012/0198705 | A1 | * | 8/2012 | Huang | ..................... | A01G 3/02 30/244 |

* cited by examiner

*Primary Examiner* — Phong H Nguyen

(57) ABSTRACT

The present application discloses a blade mechanism and an electric scissors having the blade mechanism. The blade mechanism includes a setting blade, a moving blade, and a rotating shaft assembly. The rotating shaft assembly respectively passes through the setting blade and the moving blade to allow the setting blade and the moving blade being rotatablely connected. The cutting edge of the moving blade is automatically ground when the moving blade frictionally rotates relative to the setting blade. According to the present application, the moving blade and the setting blade of the blade mechanism open or close to generate friction, allowing the cutting edge of the moving blade to be automatically ground by the setting blade, thus the durability of the moving blade is improved.

6 Claims, 5 Drawing Sheets

BLADE MECHANISM AND ELECTRIC SCISSORS HAVING BLADE MECHANISM

FIELD OF THE PRESENT DISCLOSURE

The present application relates to the technical field of scissors, in particular to a blade mechanism and an electric scissors with the blade mechanism.

DESCRIPTION OF RELATED ART

Electric scissors open and close their blades, which are driven by motor of the electric scissors, to cut objects such as tree branches. To fully cut the tree branches without adhering it to the blade and with the cut area of the tree branches neat, the moving blade needs to closely fit the setting blade during cutting. Users have to grind the blades for cutting as a result of inevitable wear of blades generated in usage which makes them blunt. Accordingly, the durability of the blades is reduced.

Therefore, it needs to design a new blade structure to solve the problem of low durability of the blades.

SUMMARY OF THE PRESENT DISCLOSURE

The present application provides a blade mechanism and an electric scissors, to solve the problem of low blade durability.

The blade mechanism provided by the present application includes a setting blade, a moving blade, and a rotating shaft assembly. The rotating shaft assembly respectively passes through the setting blade and the moving blade to allow the setting blade and the moving blade being rotatablely connected; the cutting edge of the moving blade is automatically ground when the moving blade frictionally rotates relative to the setting blade.

In some embodiments, a thread structure is provided on one side of the setting blade facing the moving blade.

In some embodiments, the rotating shaft assembly further includes an oil storage piece and a blade shaft. The oil storage piece is arranged between the setting blade and the moving blade, the blade shaft sequentially passes through the setting blade, the oil storage piece, and the moving blade; the blade shaft is provided with an oil passage for allowing lubricating oil to flow from an end of the blade shaft to the oil storage piece.

In some embodiments, the rotating shaft assembly further includes a nut. The nut is threaded connected to the blade shaft and abuts against the moving blade to adjust the tightness between the moving blade and the setting blade.

In some embodiments, the rotating shaft assembly further includes a locking disk and a first screw, and the locking disk is threaded connected to the outer peripheral wall of the blade shaft. A waist-type hole is provided in the locking disk, and the first screw passes through the waist-type hole to connect the setting blade.

In some embodiments, the rotating shaft assembly further includes a second screw. The second screw is connected with one end of the blade shaft away from the oil passage and abuts against the nut.

In order to solve the problem of low durability of the blades, the present application also provides an electric scissors having the blade mechanism.

In some embodiments, the electric scissors includes a motor, a gear, and swing teeth. An output end of the motor is connected with the gear, the gear is meshed with the swing teeth, and the swing teeth are connected with the moving blade of the blade mechanism.

In some embodiments, the electric scissors further includes a socket. The socket is electrically connected with the motor, and the socket is configured to detachably and electrically connect a battery pack.

In some embodiments, the electric scissors further includes a bevel gear and a gear plate, the bevel gear is connected with the output end of the motor, the bevel gear is meshed with the gear plate, and the gear is coaxially connected with the gear plate.

In the present application, the moving blade opens and closes and rotates relative to the setting blade, so as to cut objects. At the same time, being different from prior art, friction is generated between the moving blade and the setting blade, which allows the setting blade automatically grinding the cutting edge of the moving blade, i.e., cutting once makes grinding once. Thereby, the durability of the cutting edge of the moving blade is greatly improved, and the daily care of the cutting edge of the moving blade is reduced.

DETAILED DESCRIPTION OF THE EXEMPLARY EMBODIMENT

In the following, the technical schemes in the embodiments of the present application will be described clearly and completely with reference to the drawings of the embodiments of the present application. Obviously, the described embodiments are only a part of embodiments of the present application, not all of the embodiments. Based on the embodiments in the present application, all other embodiments obtained by ordinary technicians in the field without creative labor are within the scope of protection in the present application.

Figure 1:
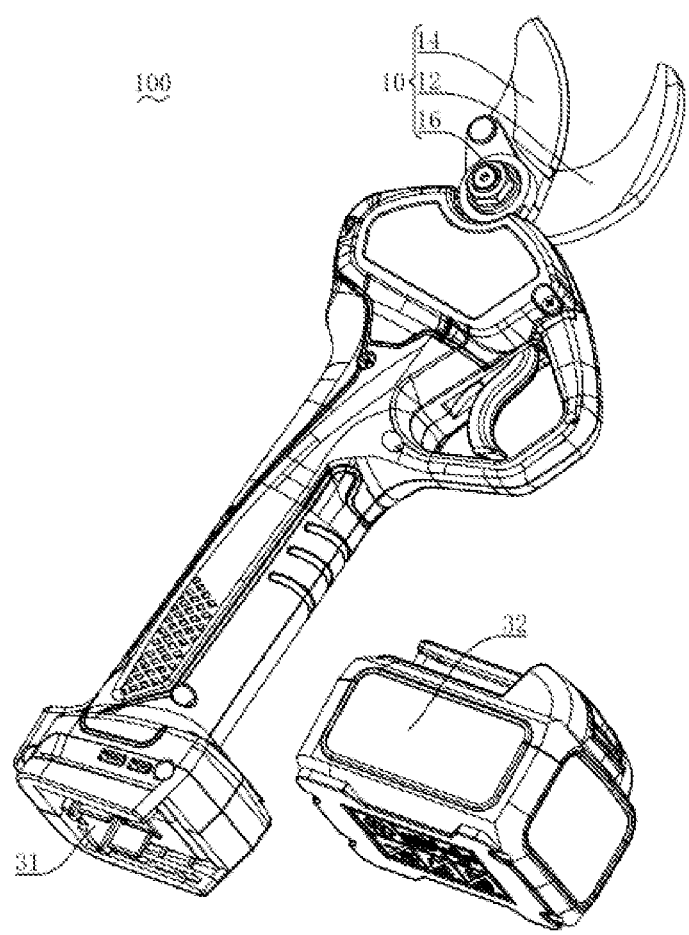
FIG. 1 is a perspective view of an electric scissors in accordance with an embodiment of the present disclosure.
Figure 2:
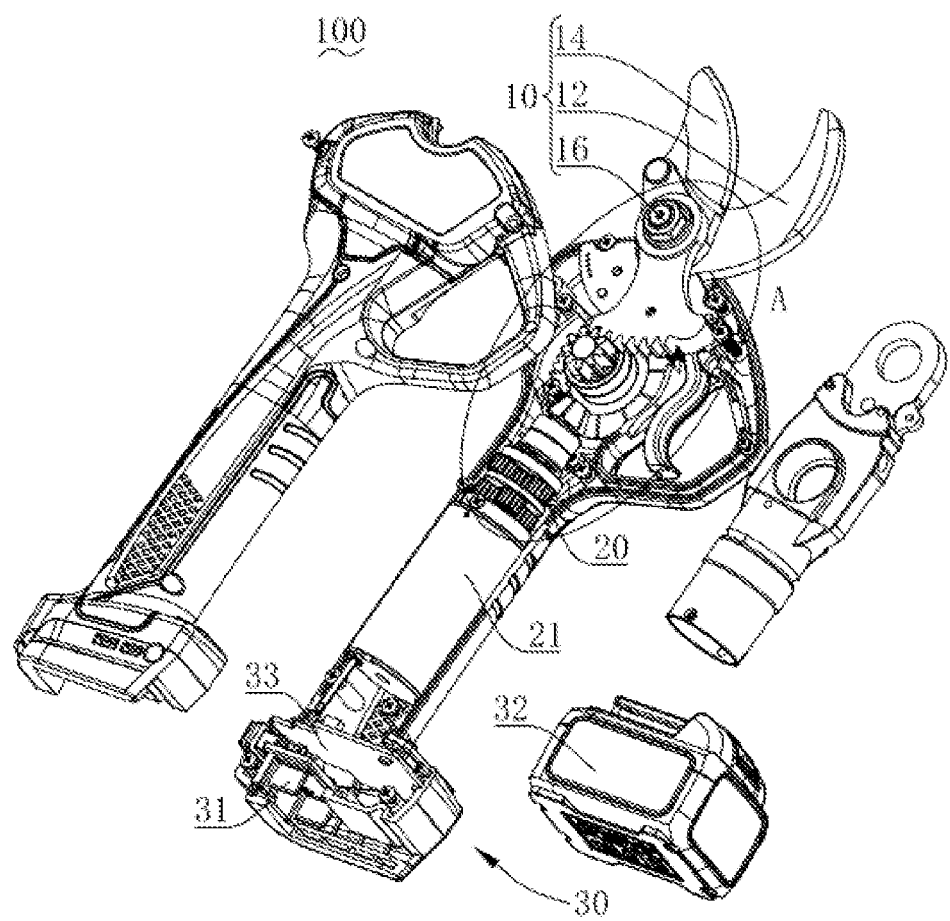
FIG. 2 is an exploded view of the electric scissors in accordance with an embodiment of the present disclosure.
Figure 3:
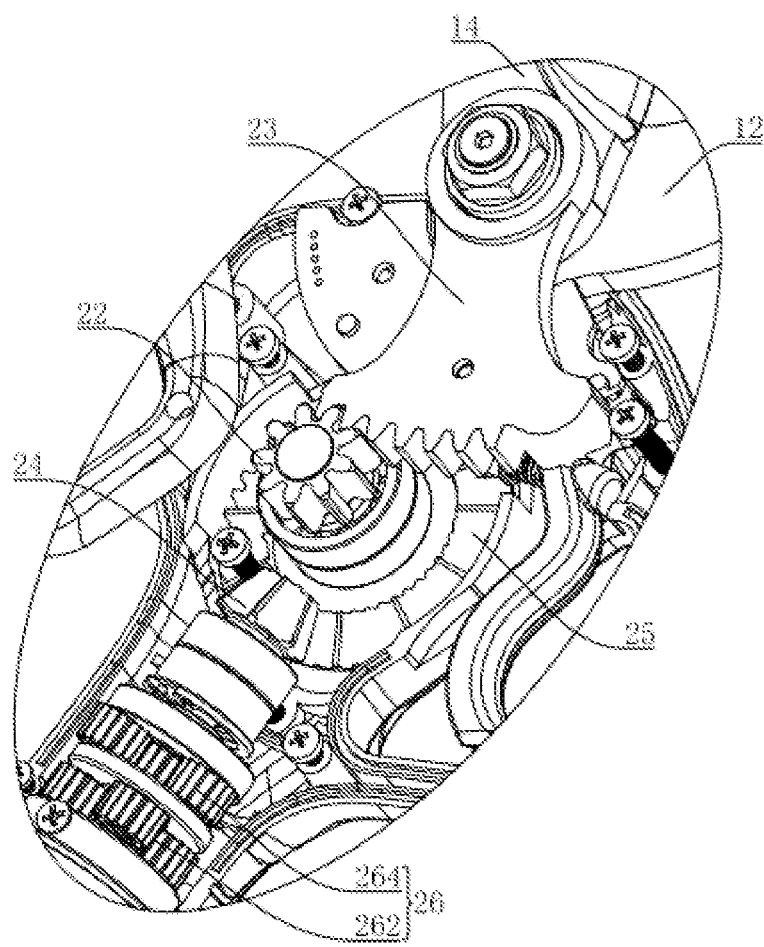
FIG. 3 is a partially enlarged view of part A in FIG. 2 in accordance with an embodiment of the present disclosure.

Please referring to FIGS. 1 to 3. FIG. 1 is a perspective view of an electric scissors 100 in accordance with an embodiment of the present disclosure; FIG. 2 is an exploded view of the electric scissors in accordance with an embodiment of the present disclosure; FIG. 3 is a partially enlarged view of part A in FIG. 2 in accordance with an embodiment of the present disclosure.

In the exemplary embodiment, the electric scissors 100 includes a blade mechanism 10 and a power mechanism 20. The output end of the power mechanism 20 is connected with the blade mechanism 10 to drive the blade mechanism 10 to open and close to cut objects, such as tree branches, iron sheets, rubber rods, and the like. It should be understood that the blade mechanism 10 may also be opened and closed by users, which is not limited here.

Specifically, the power mechanism 20 includes a motor 21, a gear 22, and a swing teeth 23. The output end of the motor 21 is connected with the gear 22, the gear 22 is meshed with the swing teeth 23, and the swing teeth 23 is connected with the moving blade 14 of the blade mechanism 10. During the motor 21 rotates reciprocally, the motor 21 drives the gear 22 to rotate reciprocally together, the swing teeth 23 swing reciprocally benefit from the engaging of the gear 22 and the swing teeth 23, and then the reciprocating swing teeth 23 drives the blade mechanism 10 to open and close. The motor 21 may be a servo motor or a stepping motor.

The power mechanism 20 further includes a bevel gear 24 and a gear plate 25. The bevel gear 24 is connected with the output end of the motor 21 and meshed with the gear plate 25, and the gear 22 is coaxially connected with the gear plate 25. Because the gear 22 is meshed with the swing teeth 23 to move so as to open and close the blade mechanism 10, the thickness direction of the gear 22 is need to be consistent with the thickness direction of the electric scissors 100. In this case, the bevel gear 24 and the gear plate 25 are added to the power mechanism 20, so that the output end of the motor 21 may be changed from the longitudinal arrangement to the transverse arrangement, thus the size of the motor 21 may be increased without increasing the thickness of the electric scissors 100, so that the blade mechanism 10 may obtain greater cutting force. In addition, the bevel gear 24 and the gear plate 25 are matched to realize a certain transmission ratio, so as to achieve the effect of reducing speed and improving torque.

The power mechanism 20 further includes a gearbox 26 through which the bevel gear 24 is connected to the motor 21, and the gearbox 26 generates variable speed and torque through different combinations of gears. The gearbox 26 of the present application may include a sun gear set 262 and a sun gear set 264. Each set of gears has three gears 22, one set of gears and a sun gear carrier constitute a sun gear set 262, and another set of gears and a planet carrier constitute a sun gear set 264. The output end of the motor 21 is connected to the sun gear set 262, the sun gear set 262 is connected to the sun gear set 264, and the sun gear set 264 is connected to the bevel gear 24. It should be understood that, in some embodiments, the bevel gear 24 and the gear plate 25 may be omitted, and the gearbox 26 is directly connected to the gear 22 and the motor 21, which will not go into details here.

The electric scissors 100 further includes an electric power assembly 30 for supplying power to the motor 21 to ensure the normal operation of the motor 21.

The electric power assembly 30 may include a socket 31 electrically connected to the motor 21. The socket 31 is configured to be detachably electrically connected to a battery pack 32 which is for powering the motor 21. It should be understood that the electric scissors 100 may be sold together with the battery pack 32 included therein. The electric scissors 100 may also be sold separately without the battery pack 32, and in this case, user may directly use the commercial power to power the electric scissors 100, or use the battery pack 32 which is in electrical cooperation with the socket 31 to power the electric scissors 100.

In order to ensure stable power supply and control, the electric power assembly 30 of the present application also introduces a circuit board 33 and a controller. The socket 31, the controller, and the motor 21 are all electrically connected with the circuit board 33. The controller is configured to control the conducting state of the motor 21.

Figure 4:
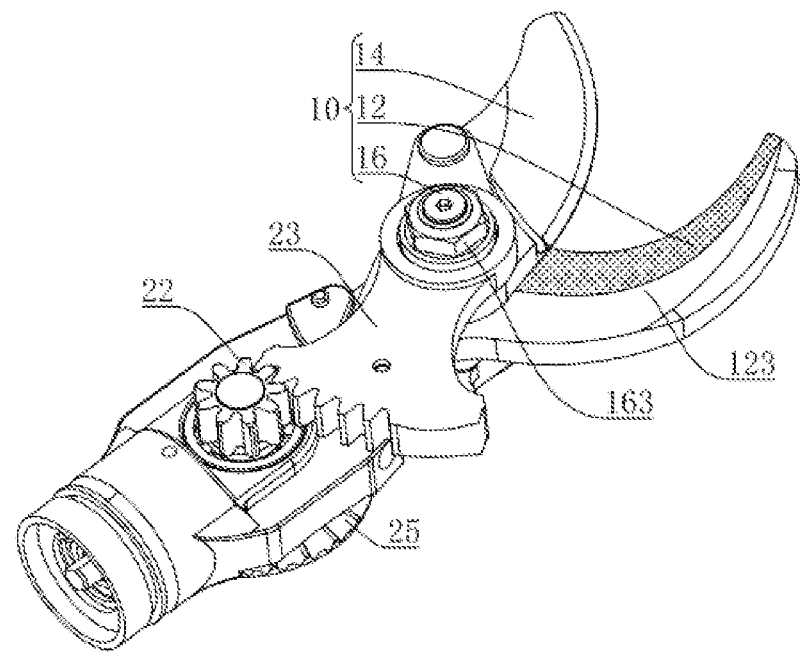
FIG. 4 is a front perspective view of the blade mechanism in accordance with an embodiment of the present disclosure.
Figure 5:
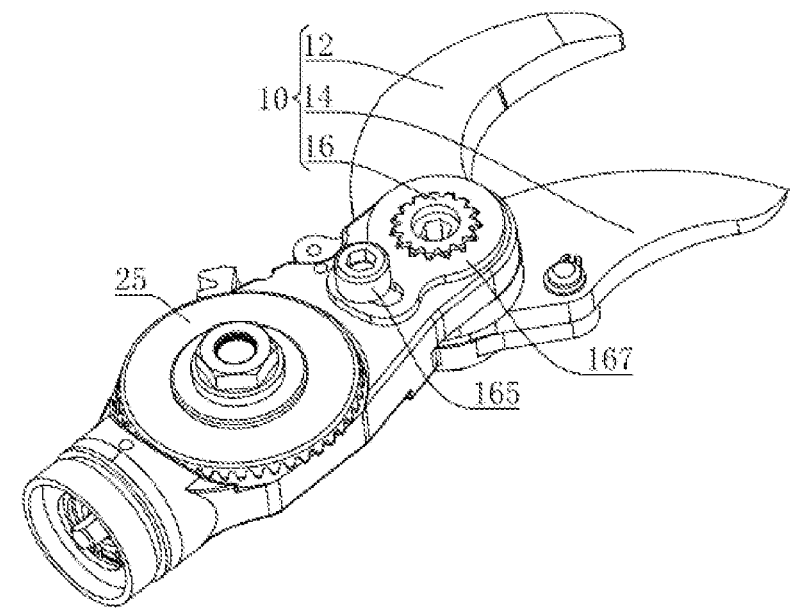
FIG. 5 is a back perspective view of the blade mechanism in accordance with an embodiment of the present disclosure.
Figure 6:
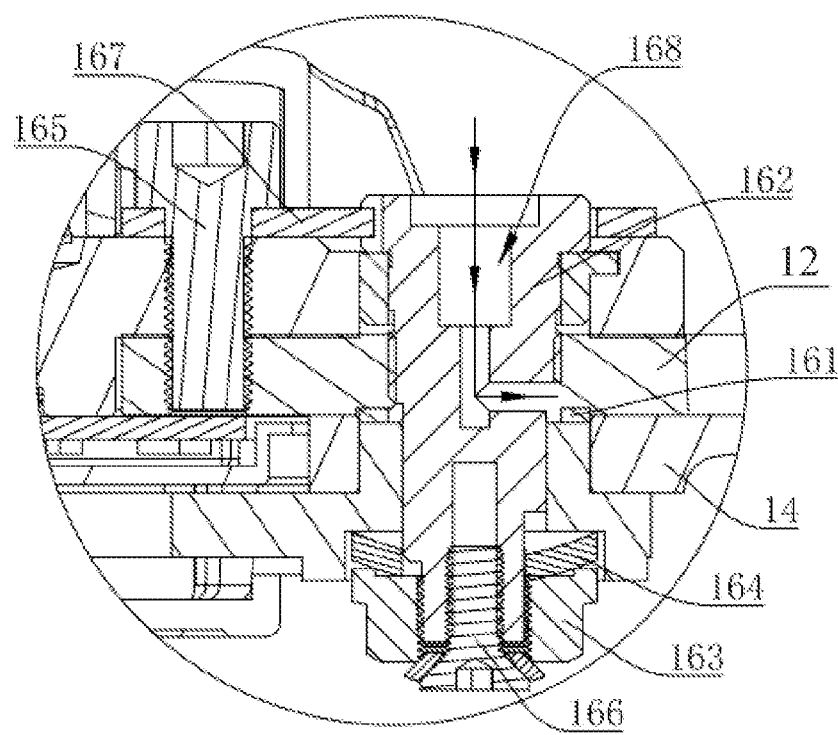
FIG. 6 is a partially enlarged cross-sectional view of the rotating shaft assembly in accordance with an embodiment of the present disclosure.

Please referring to FIGS. 4 to 6, FIG. 4 is a front perspective view of the blade mechanism in accordance with an embodiment of the present disclosure; FIG. 5 is a back perspective view of the blade mechanism in accordance with an embodiment of the present disclosure; and FIG. 6 is a partially enlarged cross-sectional view of the rotating shaft assembly in accordance with an embodiment of the present disclosure.

The blade mechanism 10 may include a setting blade 12, a moving blade 14, and a rotating shaft assembly 16. The rotating shaft assembly 16 respectively passes through the setting blade 12 and the moving blade 14 to rotationally connect the setting blade 12 and the moving blade 14. The cutting edge of the moving blade 14 is automatically ground when the moving blade 14 frictionally rotates relative to the setting blade 12.

Specifically, in the exemplary embodiment, the moving blade 14 may be connected with the swing teeth 23 of the power mechanism 20, and the swing teeth 23 are configured to drive the moving blade 14 to rotate.

In the exemplary embodiment, the moving blade 14 is opened and closed and rotated relative to the setting blade 12 so as to cut objects. At the same time, friction is generated between the moving blade 14 and the setting blade 12, so that the setting blade 12 automatically grinds the cutting edge of the moving blade 14, i.e., cutting once makes grinding once, thus the durability of the cutting edge of the moving blade 14 is greatly improved, and the daily care of the cutting edge of the moving blade 14 is reduced.

In some embodiments, a thread structure 123 is provided on one side of the setting blade 12 facing the moving blade 14 to allow the setting blade 12 to grind the moving blade 14 better.

The rotating shall assembly 16 further includes an oil storage piece 161 and a blade shall 162. The oil storage piece 161 is arranged between the setting blade 12 and the moving blade 14, and the blade shaft 162 sequentially passes through the setting blade 12, the oil storage piece 161, and the moving blade 14. The blade shaft 162 is provided with an oil passage 168 for allowing lubricating oil to flow from an end of the blade shaft 162 to the oil storage piece 161. The oil storage piece 161 is configured for storing lubricating oil. The oil storage piece 161 may be wool felt, foam, or other articles with oil storage properties. When the moving blade 14 and the setting blade 12 rotate relatively, the oil storage piece 161 releases lubricating oil to provide the moving blade 14, the setting blade 12, and the blade shaft lubricating oil, so as to lubricating the moving blade 14, the setting blade 12, and the blade shaft, allowing the moving blade 14 and the setting blade 12 to normally rub without siezing each other.

Further, the setting blade 12 and/or the moving blade 14 are provided with an accommodating groove in which the oil storage piece 161 is accommodated.

The rotating shaft assembly 16 further includes a nut 163, which is threaded connected to the blade shaft 162 and abuts against the moving blade 14 to adjust the tightness between the moving blade 14 and the setting blade 12. When the cutting edge of the moving blade 14 is still sharp, the moving blade 14 and the setting blade 12 may be loosened by the nut 163, so as to reduce excessive friction between the moving blade 14 and the setting blade 12 on the premise of normal cutting by the moving blade 14 and the setting blade 12. It should be understood that, in some embodiments, the nut 163 is threaded connected to the blade shaft 162 and abuts against the setting blade 12 to adjust the tightness between the setting blade 12 and the moving blade 14, which will not go into details here.

When the cutting edge of the moving blade 14 is passivated, the moving blade 14 and the setting blade 12 may be fastened by the nut 163, and the friction between the moving blade 14 and the setting blade 12 is increased on the premise of normal cutting by the moving blade 14 and the setting blade 12, so as to realize automatic grinding on the moving blade 14.

The rotating shaft assembly 16 further includes an arc-shaped gasket 164 sandwiched between the nut 163 and the moving blade 14. The arc-shaped gasket 164 has a certain curvature and is curved toward the nut 163. The nut 163 gives a pre-tightening force to the arc-shaped gasket 164, and the arc-shaped gasket 164 gives a pre-tightening force to the moving blade 14 by its own deformation.

The rotating shaft assembly 16 further includes a second screw 166, which is connected to the end of the blade shaft 162 away from the oil passage 168 and abuts against the nut 163 to prevent the nut 163 from separating from the moving blade 14 due to its own vibration during use of the electric scissors 100, thereby to prevent from affecting the tightness between the moving blade 14 and the setting blade 12.

The rotating shaft assembly 16 further includes a locking disk 167 and a first screw 165, and the locking disk 167 is threaded connected to the outer peripheral wall of the blade shaft 162. A waist-type hole is provided in the locking disk 167, and the first screw 165 passes through the waist-type hole to connect the setting blade 12. The first screw 165 may rotate relative to the waist-type hole, so that the locking disk 167 drives the moving blade 14 to rotate axially, thereby adjusting the tightness between the setting blade 12 and the moving blade 14.

The above description is only about some embodiments of the present application, and is not intended to limit the patent scope of the present application. Any equivalent structure or equivalent principle transformation made by using the description and drawings of the present application, or directly or indirectly applied in other related technical fields, are similarly included in the patent protection scope of the present application.

What is claimed is:

1. An electric scissors, comprising a blade mechanism, wherein the blade mechanism comprises: a setting blade, a moving blade, and a rotating shaft assembly; wherein the rotating shaft assembly respectively passes through the setting blade and the moving blade to allow the setting blade and the moving blade being rotatablely connected; the rotating shaft assembly further comprises an oil storage piece and a blade shaft, wherein the oil storage piece is arranged between the setting blade and the moving blade; the blade shaft sequentially passes through the setting blade, the oil storage piece, and the moving blade; the blade shaft is provided with an oil passage for allowing lubricating oil to flow from an end of the blade shaft to the oil storage piece, the electric scissors further comprises a motor, a first gear, and swing teeth, the motor is configured to drive the first gear to rotate reciprocally, the first gear is meshed with the swing teeth, and the swing teeth are connected with the moving blade of the blade mechanism, the electric scissors further comprises a bevel gear and a gear plate, wherein the motor is configured to drive the bevel gear to rotate, the bevel gear is meshed with the gear plate, and the first gear is coaxially connected with the gear plate.

2. The electric scissors according to claim 1, wherein a thread structure is provided on one side of the setting blade facing the moving blade.

3. The electric scissors according to claim 1, wherein the rotating shaft assembly further comprises a nut, wherein the nut is threaded connected to the blade shaft and abuts against the moving blade to adjust the tightness between the moving blade and the setting blade.

4. The electric scissors according to claim 3, wherein the rotating shaft assembly further comprises a locking disk and a first screw, wherein the locking disk is threaded connected to the outer peripheral wall of the blade shaft; a waist-type hole is provided in the locking disk; and the first screw passes through the waist-type hole to connect the setting blade.

5. The electric scissors according to claim 3, wherein the rotating shaft assembly further comprises a second screw, wherein the second screw is connected with one end of the blade shaft away from the oil passage and abuts against the nut.

6. The electric scissors according to claim 1, wherein the electric scissors further comprises a socket, wherein the socket is electrically connected with the motor, and the socket is configured to detachably and electrically connect a battery pack.

* * * * *